(12) United States Patent
Dordick

(10) Patent No.: US 8,821,044 B1
(45) Date of Patent: Sep. 2, 2014

(54) CLAMPING DEVICE FOR PHOTOGRAPHIC EQUIPMENT

(71) Applicant: Scott Dordick, La Verne, CA (US)

(72) Inventor: Scott Dordick, La Verne, CA (US)

( * ) Notice: Subject to any disclaimer, the term of this patent is extended or adjusted under 35 U.S.C. 154(b) by 0 days.

(21) Appl. No.: 13/765,587

(22) Filed: Feb. 12, 2013

(51) Int. Cl.
*G02B 17/00* (2006.01)
*G03B 17/56* (2006.01)

(52) U.S. Cl.
CPC .................................... *G03B 17/561* (2013.01)
USPC ..................... 396/423; 248/176.3; 248/187.1; 248/229.1; 248/689

(58) Field of Classification Search
USPC .................. 396/423, 428, 419; 248/540, 689, 248/124.2, 154, 229.1, 229.12, 229.26, 248/228.6, 228.8, 245, 313, 316.12, 411, 248/176.3, 187.1, 690.691
See application file for complete search history.

(56) References Cited

U.S. PATENT DOCUMENTS

| 517,360 | A | | 3/1894 | Perry, Jr. | |
| 2,351,386 | A | | 6/1944 | Zucker | |
| 2,824,504 | A | | 2/1958 | Bethmann | |
| 3,429,543 | A | | 2/1969 | Mooney | |
| 4,305,561 | A | * | 12/1981 | Hunter et al. | 248/228.3 |
| 4,496,228 | A | * | 1/1985 | Schmidt | 396/428 |
| 6,435,738 | B1 | * | 8/2002 | Vogt | 396/419 |
| 6,773,172 | B1 | * | 8/2004 | Johnson et al. | 396/428 |
| 7,077,582 | B2 | * | 7/2006 | Johnson | 396/428 |
| 7,866,899 | B2 | * | 1/2011 | Kope et al. | 396/423 |
| 8,262,299 | B2 | * | 9/2012 | Johnson | 396/428 |
| 2013/0279896 | A1 | * | 10/2013 | Johnson | 396/428 |

\* cited by examiner

*Primary Examiner* — Clayton E Laballe
*Assistant Examiner* — Warren K Fenwick
(74) *Attorney, Agent, or Firm* — Richard S Erbe

(57) ABSTRACT

The invention is a clamping device for securing photographic equipment, which includes a mounting plate to a supporting structure, such as a tripod and or to a strap. The device includes a pair of opposed sliding clamps operably attached to a base. The clamp engages opposite sides of the base and may each be moved independently of one another to secure the supporting structure and to provide the capability to adjust to small variations in mounting plate sizes between equipment brands. The device has a loop to connect a strap or a strap connector.

14 Claims, 11 Drawing Sheets

CLAMPING DEVICE FOR PHOTOGRAPHIC EQUIPMENT

RELATED APPLICATIONS

This application is a continuation-in-part application of U.S. utility patent application Ser. No. 13/081,674 filed Apr. 7, 2011, which is incorporated herein by reference.

BACKGROUND OF THE INVENTION

1. Field of the Invention

The present invention relates to the field of photographic equipment accessories. In particular, the present invention relates to a clamping device for quickly attaching and detaching a camera to a supporting structure, such as a tripod head or to a strap worn by the photographer. The device may also be used with equipment marketed by different manufacturers of photographic equipment.

2. General Background and State of the Art

Cameras are often mounted to a supporting structures, typically a tripod, in order to stabilize the camera position for taking photographs. There are a number of ways to attach cameras to tripod heads. Some cameras have threaded sockets in their bases for direct mounting to a fastener extending from the tripod. This method is time consuming and requires that the user take care that threads are properly aligned. Making adjustments or quickly changing setups are difficult with this arrangement. In the same way, cameras can also be connected to a strap or an enhanced camera transport straps U.S. Pat. No. 7,866,899. Previously enhanced transport straps required that a connector be threaded into the camera and the switching between the support structure and the enhanced strap required that the threaded connector first be unthreaded.

Also, variations between manufacturers of cameras and supporting structures are often found because of different design standards among the manufacturers, so using a certain brand of camera with a variety of manufacturers' supporting structures may be problematic. When photographing on a tripod it is often desirable to remove the strap from the camera to prevent any vibrations that could be caused by the strap movement especially when photographing outdoors on windy days.

To overcome these problems, cameras may be semi-permanently attached to an adapter plate (commonly known as a plate or quick release plate) by a clamping device that is semi-permanently attached to a tripod. This clamping device is designed to enable the user to quickly attach and remove a camera from a tripod head.

The clamping device may also be semi-permanently attached to a strap by putting a strap through the strap loop or to an enhanced camera strap using the enhanced straps, carabineer type hook, onto the loop of the clamping device.

With a clamping device semi-permanently attached to both the tripod and the camera strap, a photographer can quickly remove the camera from its strap and quickly attach it to the tripod and then when finished photographing, can quickly reattach the camera to its strap.

Traditionally, the clamping device may include an adjustment knob or a lever. There are those in the photographic field who believe that a knob has disadvantages, in that it may to too slow to use or could be accidentally loosened. A lever generally provides a quicker way of clamping and unclamping the plate, but generally does not provide the ability to use the clamp with small variations in equipment sizes among different manufacturers.

Thus there is a need for a clamping device that allows for quick attachment and detachment of cameras from supporting structures and straps that also allows for use with a variety of equipment sizes because of variations in design among manufacturers of photographic equipment.

There is also a need for a clamping device for use with photographic equipment that ensures that a camera will have a firm and stable foundation when mounted on a supporting structure, such as a tripod.

There is also a need for a clamping device for use with photographic equipment that allows quick and easy attachment to a supporting structure and can be quickly and easily removed and attached to a camera strap.

The clamping device according to the present invention overcomes the problems of prior art devices and methods and provides further advantages, as will be described.

SUMMARY OF THE INVENTION

The present invention, in a broad aspect, provides a clamping device for securing photographic equipment to a support structure or strap, such as a device for securing a camera to a tripod. In one aspect of the invention, the clamping device includes a base having two opposed walls, each of which includes a slot running along the entire length of the wall.

A pair of opposed sliding clamps each having an extension are engaged with the base, with the extension of each sliding clamp engaged in the slot on one of the walls of the body. Each of the clamps is configured to be moved relative to the base and to each other, so that the space in between the two clamps may be varied. A plurality of springs mounted in each slot may be provided to engage the extensions.

Each of the sliding clamps also includes an angled engaging surface for engaging the quick release plate of the photographic equipment.

The sliding clamps are moved in relation to the base, and to each other, by different structures. One of the sliding clamps is moved in relation to the base by means of a tension knob. The tension knob may cause the sliding clamp to be moved toward or away from the opposite sliding clamp as the extension on the sliding clamp engages a slot on the base. As the tension knob is rotated, it may increase or decrease pressure on a spring and stud combination to which operably connects the knob to the base. The stud extends through a sliding clamp and into the base.

The other sliding clamp is moved in relation to the base by means of a clamping arm and bolt combination that operably connects the clamping arm to the base. Movement of the clamping arm causes the sliding clamp to move towards or away from the opposed sliding clamp as the extension on the sliding clamp engages a slot on the on the base.

The movement of the two sliding clamps on the base allows the user to quickly adjust the space between the clamps so that variations in sizes of quick release plates between equipment models and manufacturers can be easily accommodated. The use of different structures to move the sliding clamps relative to the base and to each other provides a way to ensure that the photographic equipment is properly secured to the support structure and provides a very stable foundation for the photographic equipment.

The clamping arm may also include a lock so that once the sliding clamp is in the desired position, it will be more difficult for the clamping arm, and thus the sliding clamp, to be unintentionally moved.

Further features and advantages of this invention will become more apparent from the following description of the preferred embodiment, which, taken in conjunction with the accompanying drawings, will illustrate, by way of example, the principles of the invention.

BRIEF DESCRIPTION OF THE DRAWINGS

The foregoing and other aspects and advantages will be better understood from the following detailed description of the exemplary embodiments of the invention with reference to the drawings in which.

DETAILED DESCRIPTION OF THE PREFERRED EMBODIMENTS OF THE INVENTION

Figure 1:
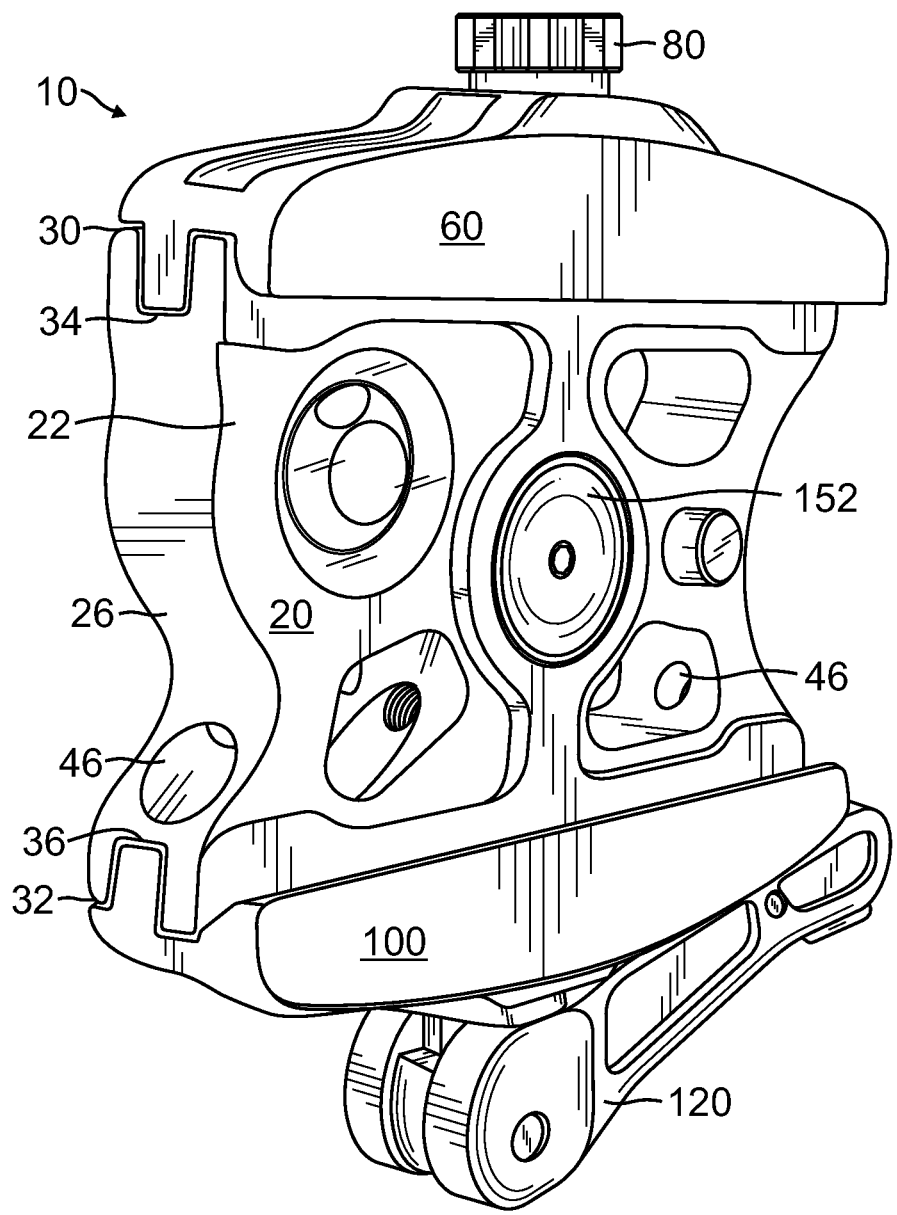
FIG. 1 illustrates a perspective view of an exemplary embodiment of a clamping device according to the present invention.
Figure 2:
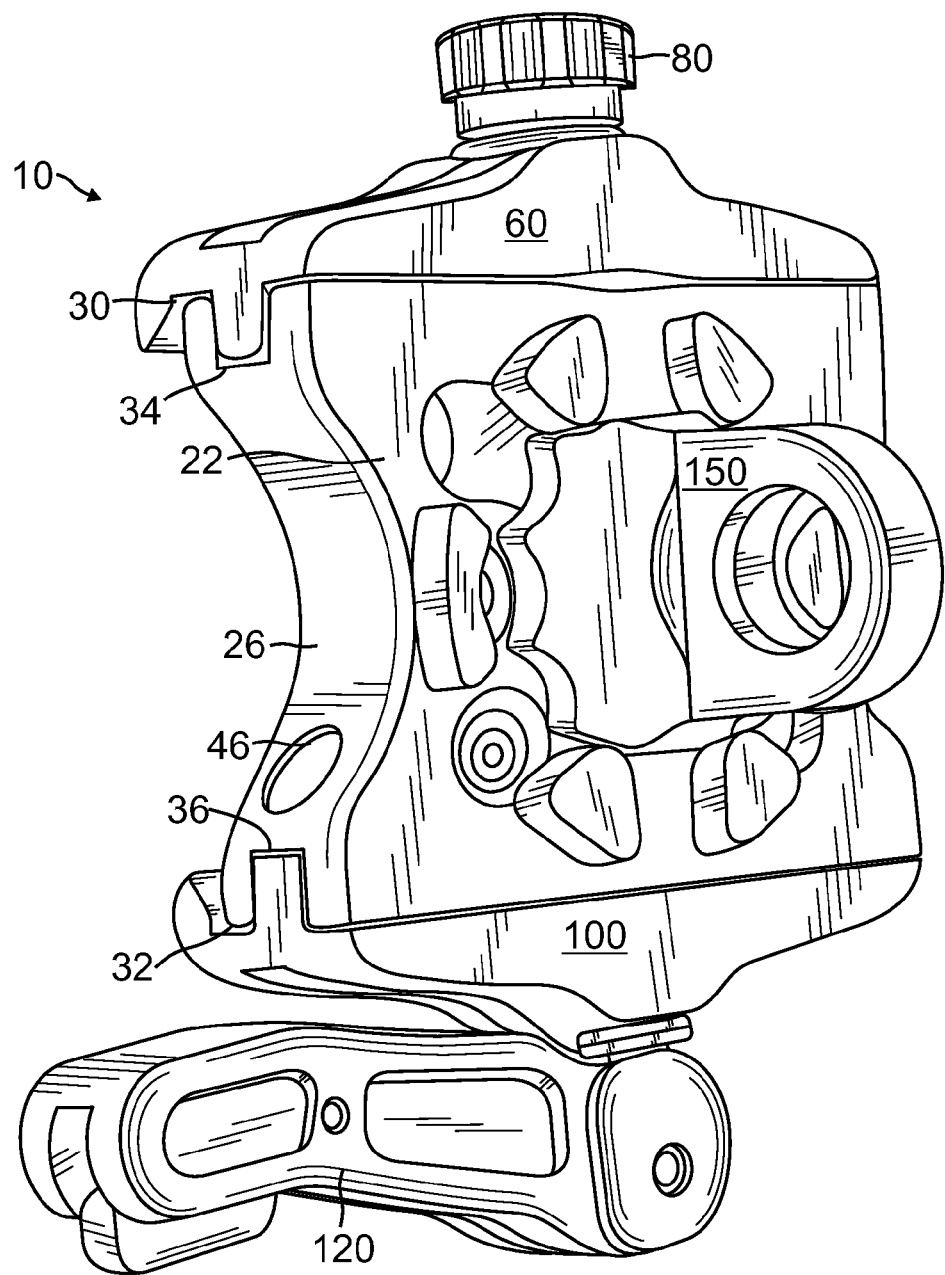
FIG. 2 illustrates a bottom perspective view of an exemplary embodiment of a clamping device according to the present invention.
Figure 3:
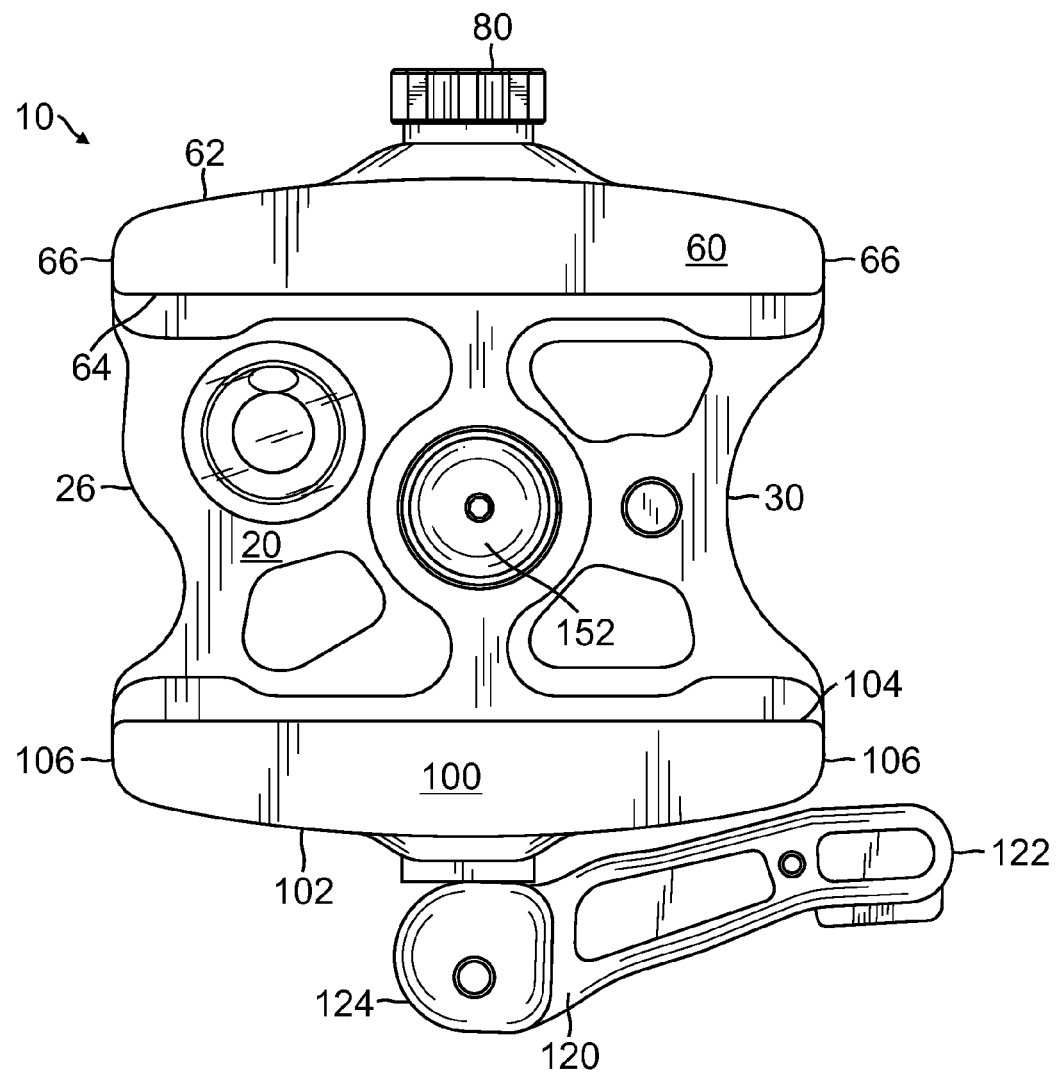
FIG. 3 illustrates a top view of an exemplary embodiment of a clamping device according to the present invention.
Figure 4:
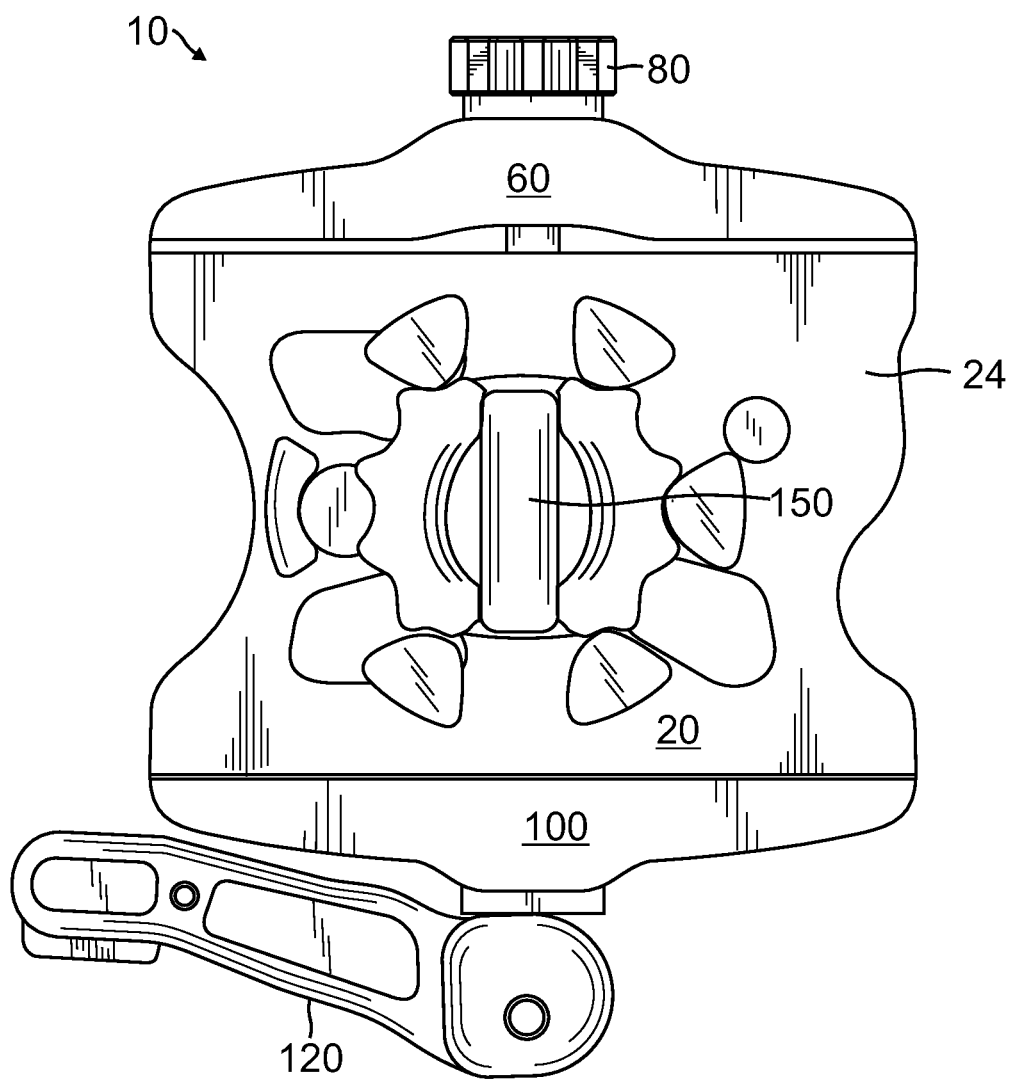
FIG. 4 illustrates a bottom view of an exemplary embodiment of a clamping device according to the present invention.
Figure 5:
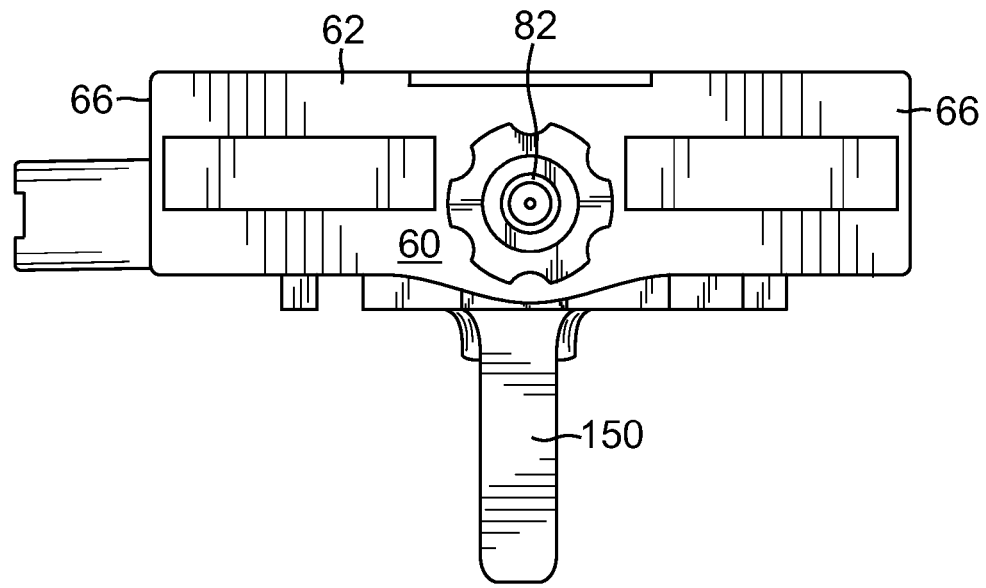
FIG. 5 illustrates a rear elevation view of an exemplary embodiment of a clamping device according to the present invention.
Figure 6:
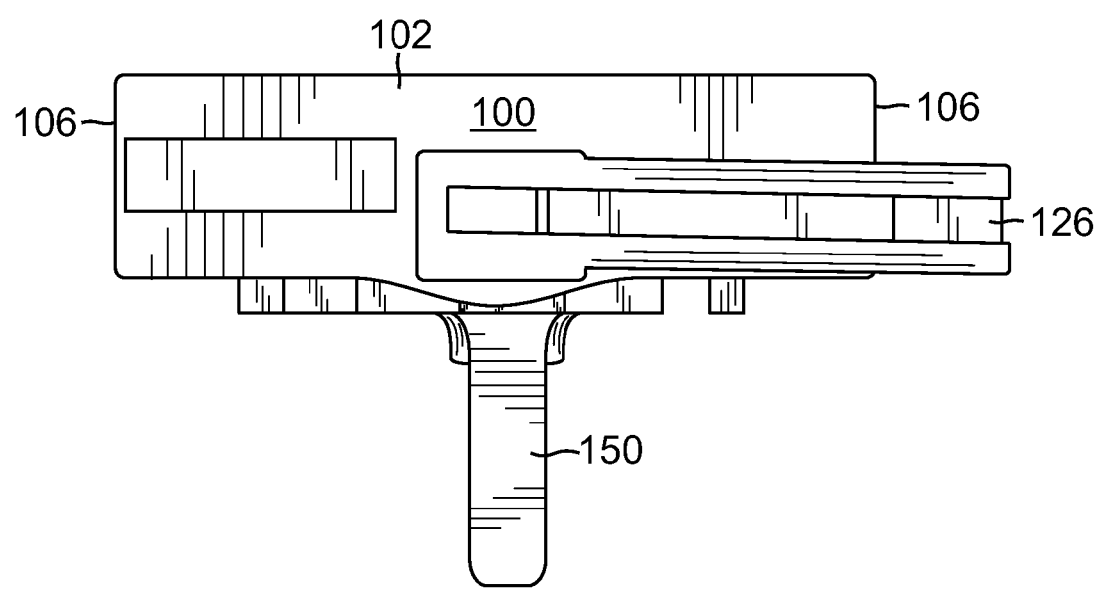
FIG. 6 illustrates a front elevation view of an exemplary embodiment of a clamping device according to the present invention.

In the following description of the invention, reference is made to the accompanying drawings, which form a part thereof, and in which are shown, by way of illustration, an exemplary embodiment illustrating the principles of the clamping device of the present invention and how it may be practiced and assembled. It is to be understood that other embodiments may be utilized to practice the present invention and structural and functional changes may be made thereto without departing from the scope of the present invention.

An exemplary embodiment of a clamping device for use with photographic equipment according to the present invention is generally indicated by the numeral 10 and is illustrated in FIGS. 1-12. Clamping device 10 generally is comprised of base 20, first sliding clamp 60 and second sliding clamp 100. First sliding clamp 60 is positioned by means of operating knob 80, while second sliding clamp 100 is positioned by means of clamping arm 120.

Base 20 includes front surface 22, rear surface 24, left side wall 26, and opposed right side wall 28. Side walls 26 and 28 extend between first wall 30 and opposed second wall 32. First wall 30 includes first slot 34 extending along its face and second wall 32 includes second slot 36 extending along its face.

Base 20 also includes a mounting hole 38, which may be used for a screw for securing a tripod head or strap loop 150 to clamping device 10. Mounting hole 38 can also be used with a reducer bushing 151 to allow use of a smaller screw 152 than would otherwise be required for mounting hole 38.

It is also to be understood that base 20 and strap loop 150 may be constructed as one piece.

Further features of base 20 include a pair of opposed sleeves 46 which are positioned along side walls 26 and 28 to accommodate set screws 48.

Spring sleeves 50 in first slot 34 and second slot 36 are configured to accommodate springs 56. Base 20 also includes first stud sleeve 52 and first bolt sleeve 54.

First sliding clamp 60 includes outer wall 62, opposed inner wall 64 and opposed side walls 66 extending between outer wall 62 and inner wall 64. Extension 68 extends from inner wall 64 and is configured for sliding engagement with first slot 34 in base 20. Engaging surface 70 extends from inner wall 64 and is preferably angled to enable engagement with a quick release plate 153 that can be attached to a camera 160 or other supporting structures of photographic equipment.

Movement of first sliding clamp 60 is controlled by tension knob 80, which is operably connected to base 20 by means of bolt spring 84 engaging tension stud 86. Tension stud 86 extends through first stud sleeve 52 in base 20 and second stud sleeve 86 in first sliding clamp 60, and includes first end 88 and second end 90. Spring 84 is positioned in spring mounting pocket 72. Rotation of tension knob 80 causes movement of the knob on tension stud 86, which enables extension 68 to slide within first slot 34 and thus adjust the position of first sliding clamp 60 in relation to base 20 and second sliding clamp 100 and to any support structure for mounting on clamping device 10. Fastener 82 secures tension knob 80 to stud 86

Second sliding clamp 100 includes outer wall 102, inner wall 104, and opposed side walls 106 extending between outer wall 102 and inner wall 104. Extension 108 extends from inner wall 104 and is configured for sliding engagement with second slot 36 in base 20. Engaging surface 110 extends from inner wall 104 and is preferably angled to enable engagement with a quick release plate 153 that can be attached to a camera 160 or other supporting structures of photographic equipment.

Movement of second sliding clamp 100 is controlled by clamping arm 120, which is operably connected to base 20 by means of clevis bolt 136. Clevis bolt 136 extends through first bolt sleeve 54 in base 20 and second bolt sleeve 112 in second sliding clamp 100. Movement of clamping arm 120 causes movement of sliding clamp 100, which enables extension 108 to slide within second slot 36 and thus adjust the position of second sliding clamp 100 in relation to first sliding clamp 60 and to any support structure for mounting on clamping device 10.

Figure 7:
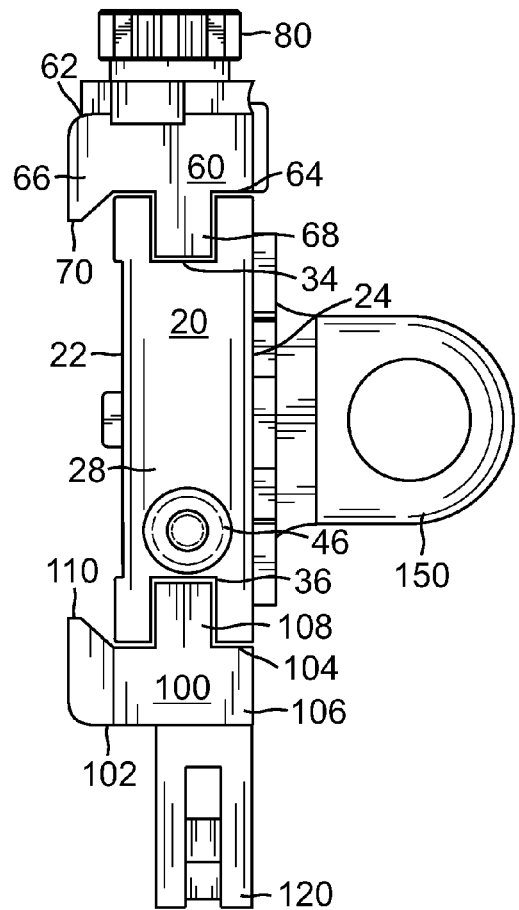
FIG. 7 illustrates a right side elevational view of an exemplary embodiment of a clamping device according to the present invention.
Figure 8:
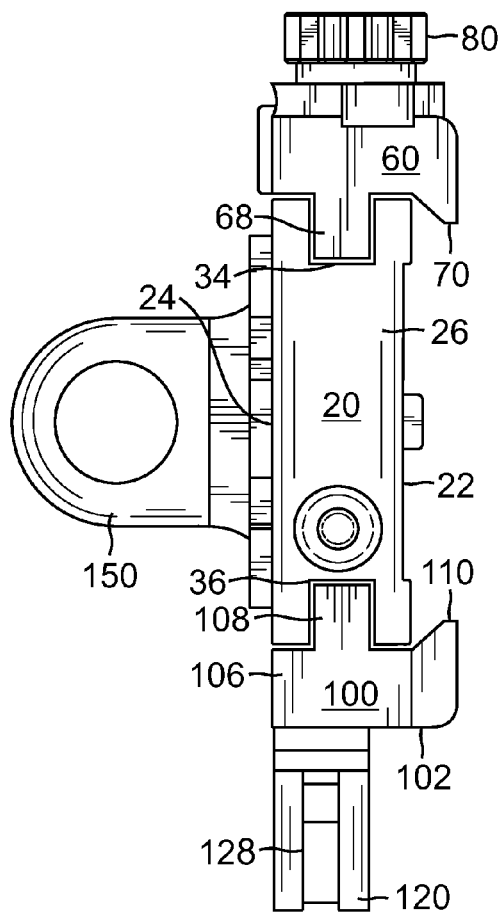
FIG. 8 illustrates a left side elevational view of an exemplary embodiment of a clamping device according to the present invention.
Figure 9:
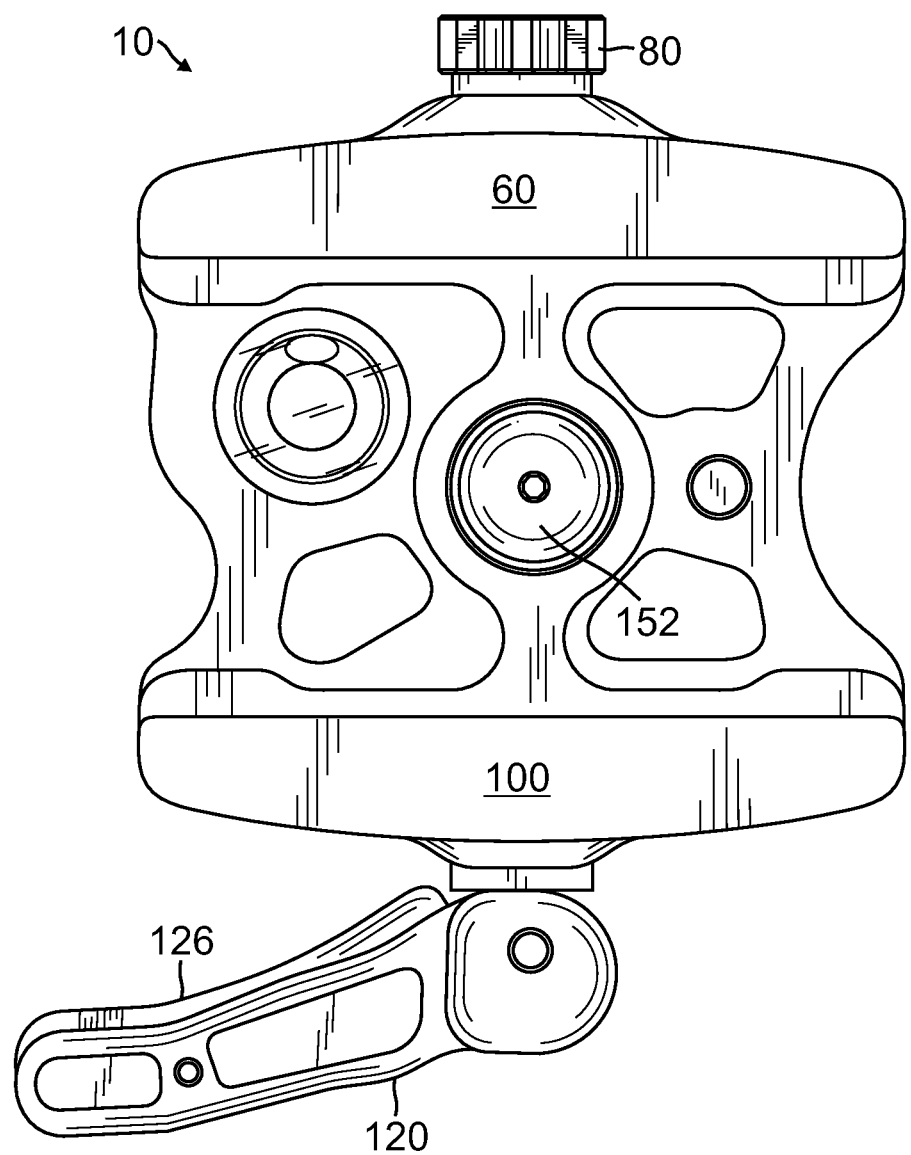
FIG. 9 illustrates a top view of an exemplary embodiment of a clamping device according to the present invention, with the clamping arm shown in a different position.
Figure 10A:
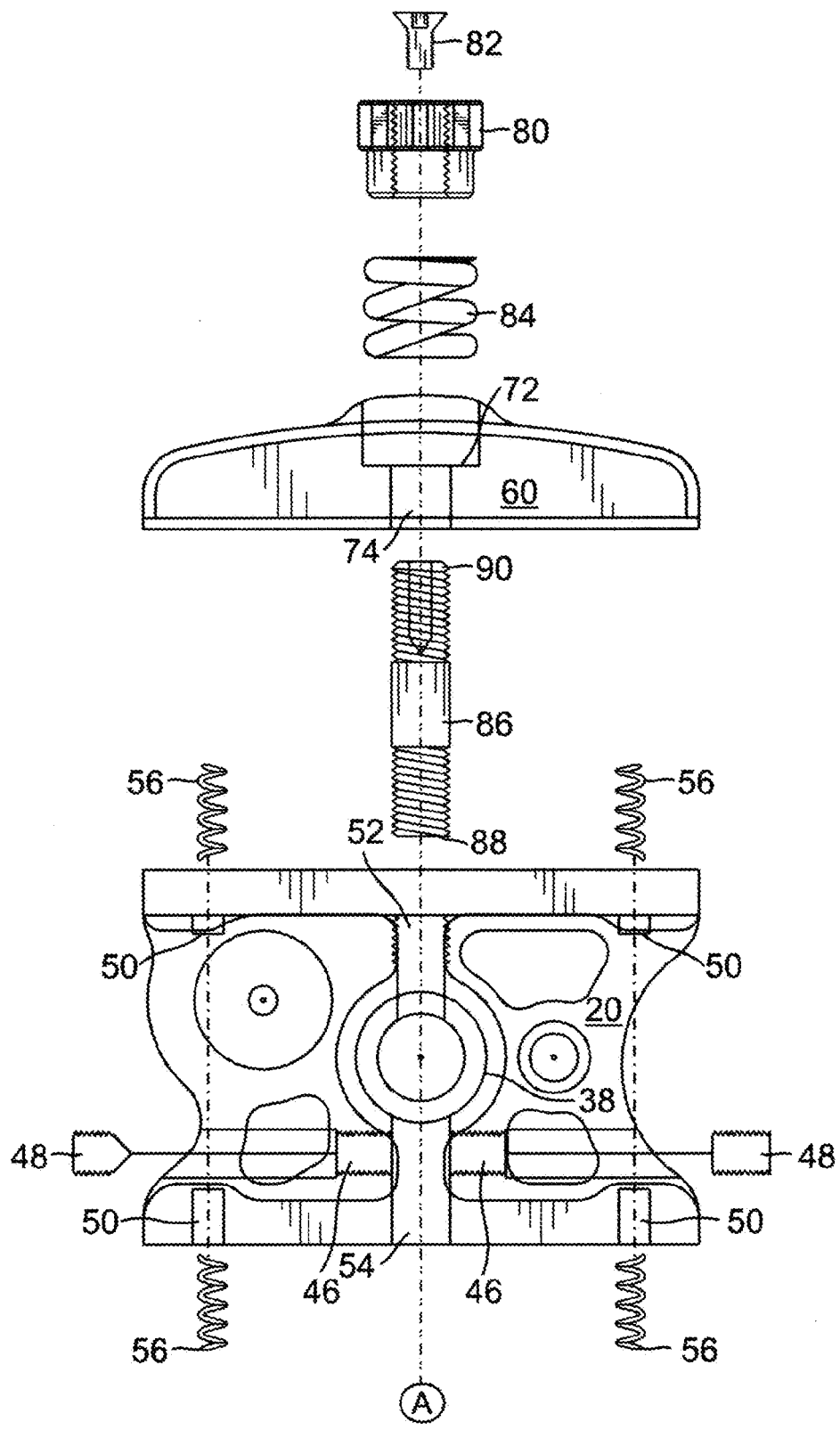
FIGS. 10A and 10B illustrate an exploded view of an exemplary embodiment of a clamping device according to the present invention.
Figure 10B:
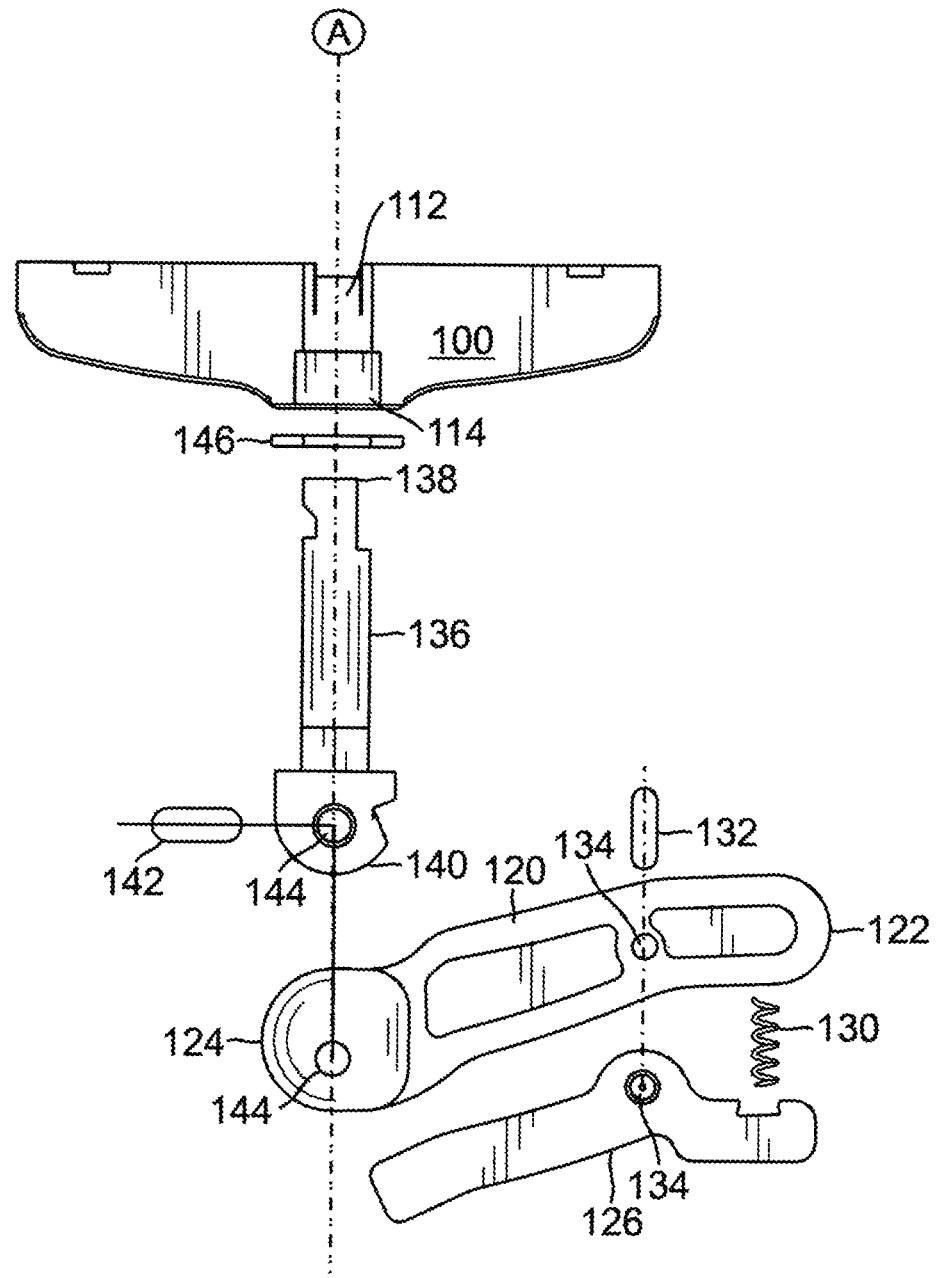
Figure 11:
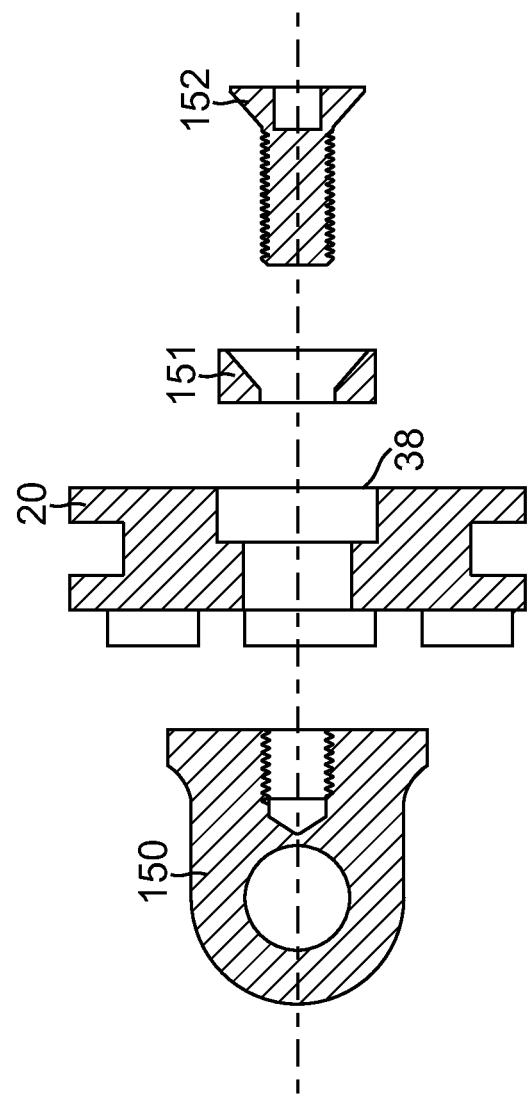
FIG. 11 illustrates an exploded left side sectional view of an exemplary embodiment of a clamping device according to the present invention.
Figure 12:
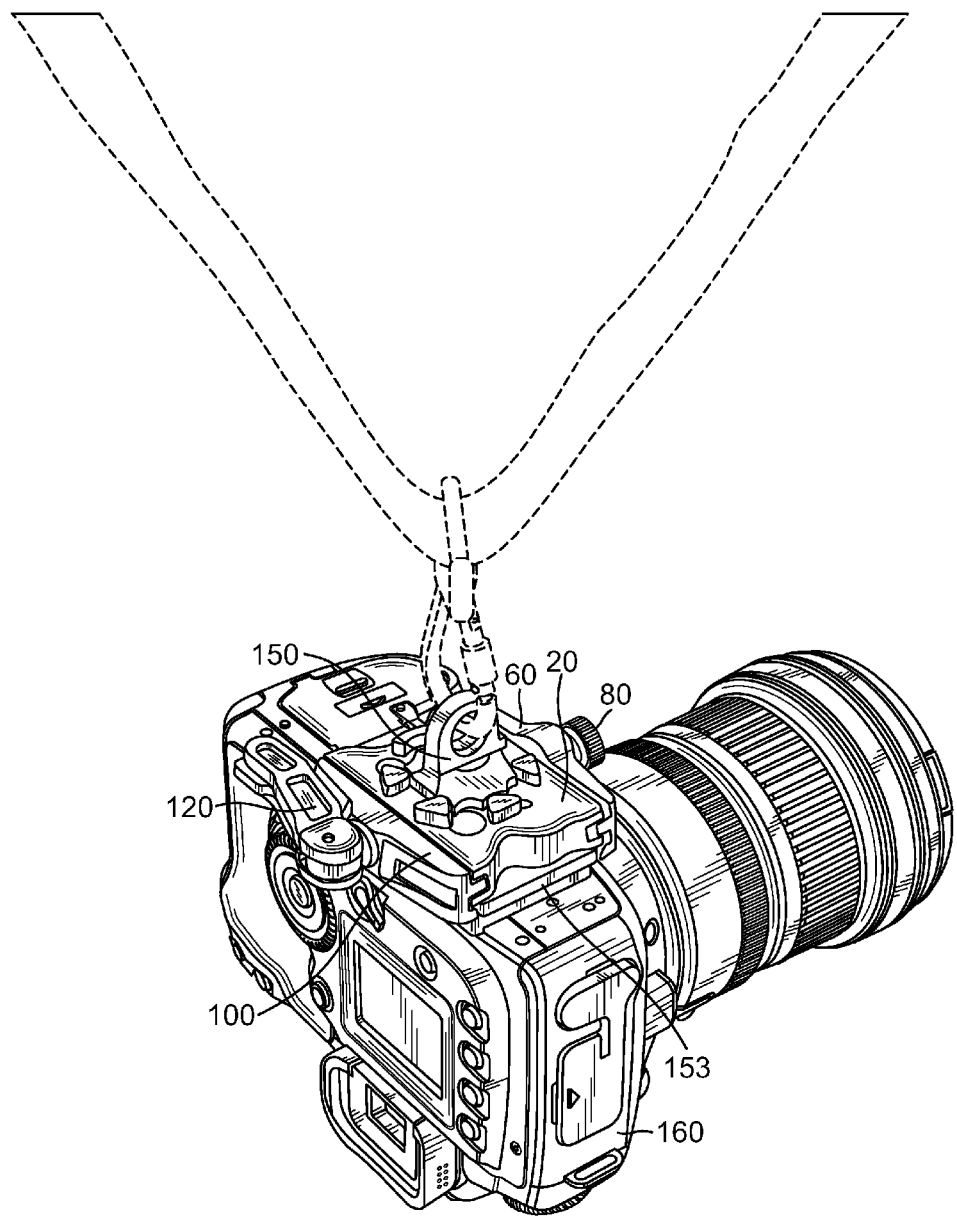
FIG. 12 illustrates a perspective view of the implementation of an exemplary embodiment showing the camera and prior art strap and connector. The dashed lines are shown for reference only.

FIGS. 7 and 9 show details of the construction of clamping arm 120. Clamping arm 120 includes a distal end 122 and proximal end 124, which attaches to clevis bolt 136. Clevis bolt 136 includes first end 138 and second end 140. First end 138 extends through second bolt sleeve 112 and bolt mounting pocket 114. Attachment pin 142 enables attachment of bolt 136 to clamping arm 120 by means of openings 144. Washer 146 completes the assembly of parts for operation.

Clamping arm 120 further includes a clamping arm lock 126 which is contained in indent 128 in clamping arm 120. Clamping arm lock 126 enables clamping arm 120 to be locked in the positions shown in FIGS. 1-7 to facilitate secure attachment of photographic equipment to a support structure. Clamping arm lock 126 is attached to clamping arm 120 by means of pin 132 through openings 134. Spring 130 modulates movement of clamping arm lock 126 with respect to clamping arm 120.

The use of tension knob 80 is to enable adjustment of the position of first sliding clamp 60 with relation to base 20 and to second sliding clamp 100, and the use of clamping arm 120 to enable adjustment of the position of second sliding clamp 100 with relation to base 20 and to first sliding clamp 60 provides the ability of clamping device 10 to secure a wide variety of sizes of support structures and provides the ability to make small but necessary adjustments as needed.

It is also to be understood that strap loop 150 could have a rectangular or other shape that would facilitate a piece of webbing that is typically used in camera or equipment straps to be threaded through.

The foregoing description of an exemplary embodiment of the present invention has been presented for purposes of enablement, illustration and description. It is not intended to be exhaustive of or to limit the present invention to the precise form discussed. There may be, however, other configurations of clamping devices for use with photographic equipment not specifically described herein, but with which the present invention is applicable. The present invention should therefore not be seen as limited to the particular embodiment described herein; rather, it should be understood that the present invention has wide applicability with respect to clamping devices for use with photographic equipment and their manufacture and method of use that function in a similar manner to the exemplary embodiment described and illustrated herein. Such other configurations can be achieved by those skilled in the art in view of the description herein. Accordingly, the scope of the invention is defined by the following claims.

What is claimed is:

1. A clamping device for securing photographic equipment to a support structure or strap, said device comprising:
   a base having opposed first and second walls, each of said walls having a slot;
   a first sliding clamp having an extension for engaging one of said slots, said first sliding clamp configured to move relative to said base;
   a second sliding clamp having an extension for engaging one of said slots, said second sliding clamp configured to move relative to said base,
   wherein one of said sliding clamps is operably connected to said base by a tension knob capable of causing movement between the sliding clamp and the base; and
   a loop to connect a strap or strap connector to said base.

2. The device according to claim 1, wherein one of said sliding clamps is operably connected to said base by a clamping arm capable of causing movement between the sliding clamp and the base.

3. The device according to claim 2, wherein said clamping arm further includes an arm lock.

4. The device according to claim 1, wherein each of said sliding clamps further includes an engaging surface.

5. A clamping device for securing photographic equipment to a support structure, said device comprising:
   a base having opposed first and second walls, each of said walls having a slot;
   a plurality of springs mounted in each of said slots;
   a first sliding clamp having an extension for engaging said springs in one of said slots, said first sliding clamp configured to cause sliding movement relative to said base; and
   a second sliding clamp having an extension for engaging said springs in one of said slots, said first sliding clamp configured to cause sliding movement relative to said base.

6. The device according to claim 5, wherein said first sliding clamp is operably connected to said base by a tension knob capable of causing movement between said first sliding clamp and the base, and wherein, said tension knob may fix the position of said first sliding clamp relative to said base.

7. The device according to claim 5, wherein said second sliding clamp is operably connected to said base by a clamping arm capable of causing movement between said second sliding clamp and the base, and wherein, said clamping arm may fix the position of said second sliding clamp relative to said base.

8. The device according to claim 7, wherein said clamping arm further includes an arm lock.

9. The device according to claim 5, wherein each of said sliding clamps further includes an engaging surface.

10. A clamping device for securing photographic equipment to a support structure or strap, said device comprising:
    a base having opposed first and second walls and a pair of opposed side walls extending between said first and second walls, each of said first and second walls having a slot;
    a first sliding clamp having an extension for engaging the slot in said first wall, said first sliding clamp configured to cause sliding movement relative to said base by means of a tension knob operably connected between said first sliding clamp and said base; and
    a second sliding clamp having an extension for engaging the slot in said second wall, said second sliding clamp configured to cause sliding movement relative to said base by means of a clamping arm operably connected between said second sliding clamp and said base.

11. The device according to claim 10, further comprising a plurality of springs mounted in each of said slots.

12. The device according to claim 10, wherein said clamping arm further comprises an arm lock.

13. The device according to claim 10, wherein said tension knob is operably connected to said base by means of a spring and a stud.

14. The device according to claim 10, wherein said clamping arm is operably connected to said base by means of a clevis bolt.

* * * * *